US007952535B2

(12) United States Patent
Watanabe et al.

(10) Patent No.: US 7,952,535 B2
(45) Date of Patent: May 31, 2011

(54) ELECTRONIC VISUAL JOCKEY FILE

(75) Inventors: Seiichiro Watanabe, Los Gatos, CA (US); Kazuhisa Terasaki, Campbell, CA (US)

(73) Assignee: Mediatek Singapore Pte Ltd, Singapore (SG)

( * ) Notice: Subject to any disclaimer, the term of this patent is extended or adjusted under 35 U.S.C. 154(b) by 1284 days.

(21) Appl. No.: 11/174,351

(22) Filed: Jun. 30, 2005

(65) Prior Publication Data
US 2006/0188237 A1 Aug. 24, 2006

Related U.S. Application Data

(60) Provisional application No. 60/654,709, filed on Feb. 20, 2005.

(51) Int. Cl.
*G09G 5/00* (2006.01)
*G06F 3/00* (2006.01)
(52) U.S. Cl. .......................... 345/2.2; 715/730
(58) Field of Classification Search .................. 345/765, 345/2.2; 715/201, 501.1, 730–732; 348/207.11, 348/231.2–231.4, 333.05
See application file for complete search history.

(56) References Cited

U.S. PATENT DOCUMENTS

| 5,835,641 | A | 11/1998 | Sotoda et al. | 382/291 |
|---|---|---|---|---|
| 6,072,480 | A | 6/2000 | Gorbet et al. | 715/730 |
| 6,237,010 | B1 | 5/2001 | Hui et al. | 707/502 |
| 6,249,316 | B1 | 6/2001 | Anderson | 348/333.05 |
| 6,570,617 | B2 | 5/2003 | Fossum et al. | 348/308 |
| 6,683,649 | B1 | 1/2004 | Anderson | 348/333.05 |
| 6,738,075 | B1 | 5/2004 | Torres et al. | 715/723 |
| 7,051,275 | B2 * | 5/2006 | Gupta et al. | 715/201 |
| 7,158,175 | B2 | 1/2007 | Belz et al. | 348/231.3 |
| 7,239,348 | B2 * | 7/2007 | Miyazaki | 348/231.4 |

(Continued)

FOREIGN PATENT DOCUMENTS

JP 9-130674 10/1995

(Continued)

OTHER PUBLICATIONS

Optical Storage Technology Association; MPV Presentation Profile Specification; Mar. 11, 2003; Optical Storage Technology Association, Inc.; Version 1.01.*

(Continued)

*Primary Examiner* — Chanh Nguyen
*Assistant Examiner* — Adam J Snyder
(74) *Attorney, Agent, or Firm* — Imperium Patent Works; T Lester Wallace; Zheng Jin

(57) ABSTRACT

A digital camera has output ports that are connectable by cables to an HDTV television. The camera generates a slide show viewable on the television screen. The slide show involves a sequence of images stored on the camera and audio stored on the camera. The slide show is supplied to the television in the form of an HDTV resolution video stream and an accompanying audio stream. A user selects one of a plurality of scenarios for the slide show. The particular scenario determines how identified images will be presented. Using camera buttons, the user can stop and start the slide show and can move a pointer on the television screen. A standard EVJ file that defines the slide show in accordance with a scenario is generated by the camera. The file can be played on any rendering device that supports the EVJ functionality so as to recreate the slide show.

20 Claims, 14 Drawing Sheets

U.S. PATENT DOCUMENTS

| | | | |
|---|---|---|---|
| 2002/0054116 A1* | 5/2002 | Pavley et al. | 345/765 |
| 2003/0012425 A1 | 1/2003 | Suzuki et al. | 382/154 |
| 2003/0174773 A1 | 9/2003 | Comaniciu et al. | 375/240.08 |
| 2004/0002049 A1 | 1/2004 | Beavers et al. | 434/350 |
| 2004/0061791 A1* | 4/2004 | Terada | 348/231.2 |
| 2005/0086582 A1* | 4/2005 | Frojdh et al. | 715/501.1 |
| 2005/0134939 A1 | 6/2005 | Ikeda et al. | 358/471 |
| 2005/0158037 A1 | 7/2005 | Okabayashi et al. | 386/96 |
| 2005/0168453 A1 | 8/2005 | Ueda | 345/204 |
| 2006/0125922 A1* | 6/2006 | Albert et al. | 348/207.11 |
| 2006/0187331 A1 | 8/2006 | Watanabe et al. | 348/333.01 |

FOREIGN PATENT DOCUMENTS

| | | |
|---|---|---|
| JP | 2000-115675 | 10/1998 |
| JP | 2001-94924 | 9/1999 |
| JP | 2001-339682 | 5/2000 |
| JP | 2002-305705 | 4/2001 |
| JP | 2005-25715 | 11/2002 |

OTHER PUBLICATIONS

Rutledge et. al., "Special Edition Using Microsoft PowerPoint 2000", Pub. May 6, 1999, Pertinent sections: Chapter 14, Setting Slide Transitions and Chapter 15, Publishing to the Internet.*

Panasonic, Digital Camera Operating Instructions for Model No. DMC-LC33PP, Panasonic, 2003.

Yuichi Hori et al., "A Real-Time Multi Face Detection Technique Using Positive-Negative Lines-of-face Template," 17$^{th}$ Int'l Conference on Pattern Recognition, vol. 1, 2004, pp. 765-768.

User's Guide entitled, "Canon PowerShot SD430 Digital ELPH Wireless", Canon Inc., 2005, 9 pages.

User's Guide entitled, "Kodak EasyShare-One zoom digital camera", Eastman Kodak Company, 2005, P/N4J4675_en, 13 pages.

White Paper entitled, "FotoNation Connectivity Suite", FotoNation Inc., Burlingame, California, 2006, 18 pages.

* cited by examiner

ELECTRONIC VISUAL JOCKEY FILE

CROSS-REFERENCE TO RELATED APPLICATION

This application claims the benefit under 35 U.S.C. §119 of Provisional Application No. 60/654,709, entitled "Digital Camera Having Electronic Video Jockey Capability", filed Feb. 20, 2005 (the subject matter of which is incorporated herein by reference). This application is related to U.S. patent application Ser. No. 11/172,750, entitled "Digital Camera Having Electronic Visual Jockey Capability" filed Jun. 30, 2005, by Watanabe et al., the contents of which are incorporated herein by reference.

TECHNICAL FIELD

The present inventions relate to digital cameras and/or slide shows involving digital images.

BACKGROUND

Users of digital cameras often collect a large number of digital images. This gives rise to a desire to be able to show these digital images to others in the form of a slide show. Many viewer programs usable to view digital images provide a slide show feature. The digital images are typically displayed one at a time, at a constant rate, in the order in which the digital images are stored in a folder. There is no audio accompanying the slide show. Consequently, the slide show is fairly boring to many viewers.

A product called "PhotoCinema" marketed by a Japanese company called Digital Stage allows for a fairly sophisticated slide show to be created and viewed on a computer screen of a personal computer. Digital images stored on a personal computer can be presented in a variety of sequences, and individual images in a sequence can be zoomed. A chain of multiple images can be made to move from left to right across the computer screen. A chain of multiple images can be mode to move from top to bottom across the computer screen. Music can be selected to accompany the slide show. The slide show is, however, on a computer screen. There is often significant boot time to start a personal computer, and the computer often does not have the large screen that would make viewing a slide show an enjoyable activity. The personal computer may be located in an office or other out of the way place in the home that does not have the comfortable seating and lighting of the family room, or media room. Presenting a slide show on the small screen of a personal computer in the out of the way room is therefore not as pleasing as it could be.

Apple Computer has introduced an MP3 music player called the IPOD PHOTO (a portable digital media player made by Apple Computer Inc.). Some versions of the IPOD PHOTO (a portable digital media player made by Apple Computer Inc.) have an ability to store a large number of digital images on a built-in micro hard disc drive. Digital images stored on the IPOD PHOTO can be viewed in a slide show by coupling the IPOD PHOTO directly to a television. A special AV (audio/video) cable is provided for this purpose and the IPOD PHOTO has the ability to drive a video signal and an audio signal directly to the television. Touch sensitive buttons on the IPOD PHOTO are usable to select images to be displayed on the television. This aspect of the IPOD PHOTO is very popular, and the digital images stored on the IPOD PHOTO can be displayed on a television in the home where comfortable seating is generally available. It is, however, cumbersome to use the IPOD PHOTO because the digital images generally need to be loaded onto the IPOD PHOTO before the IPOD PHOTO can be used to view those images. This inconvenience and the time required to do the downloading of images into the IPOD PHOTO is undesirable. Moreover, the slide show generated by the IPOD PHOTO is fairly simple and constant. There is a constant time-per-slide value. Watching such a slide show for more than a short period of time is generally a boring experience.

Discotheques in the past had disc jockeys (DJs) that played interesting mixes of music for patrons. There typically was no imagery or video accompanying the music. The disc jockeys of the past have been replaced with what are called video or visual jockeys (VJs). In the dance clubs of today, music is often accompanied by a rich variety of still images and video clips and light shows and other imagery and audio and video effects. The VJ may, for example, have a large expensive stack of many compact disc (CD), digital video disc (DVD) players, and mixer equipment. The VJ uses this expensive equipment to combine the output of the various CD players and DVD players in an interesting fashion to suit the mood of the patrons of the club. Still images can be seen to sweep across screens in the club from one side of the screen to another, or from top to bottom, or from bottom to top as the music is playing. The scene of view can zoom into a part of an image. The scene of view can zoom back out from a part of an image. Images can be zoomed up in size, and can be zoomed down in size. Significant artistry is often involved in making the collage and flow of pictures and video match the music so that the overall experience pleasing and has the desired impact on the audience. Providing this club experience is therefore generally expensive and requires a significant degree of sophistication.

It is desired to provide an inexpensive VJ-like experience for unsophisticated consumers who want to view snapshots in the home without having to spend a lot of time learning how to program and use specialized and expensive equipment. It is desired to provide the VJ-like experience at as low of cost a possible without having to use a general-purpose computer that is slow to boot and that may not contain the pictures that are to be viewed. It is desired to provide the VJ-like experience to users who might not possess the artistic audio-visual ability of a VJ.

SUMMARY

A digital camera has a video and audio output ports that are connectable by cables to an HDTV television. The video cable may be a YCrCb component video cable. The audio cable may be an AV cable, the audio portion of which is used to communicate audio to the television. The digital camera generates a slide show that is viewable on the television screen. The slide show involves a sequence of digital still images stored on the camera and audio stored on the camera. The slide show is supplied to the television in the form of a video stream and an accompanying audio stream.

A user uses the digital camera to select the digital images that will be part of the slide show (a playlist). The user may, for example, select particular image files (for example, JPEG, BMP, TIFF, GIF format files) from a list of all the image files stored on the camera. This list may be displayed on a display of the digital camera. The user may select files from this list using buttons on the camera.

The user also selects one or more audio selections (for example, MP3, MP4, WAV, AAC, Apple Lossless files, audio snippets that are captured by the digital camera) that will be part of the slide show (a playlist). The user may, for example, select a particular audio selection from a list of audio selections that are stored on the digital camera. This list is displayed on the display of the digital camera. The user identifies an audio selection from the list using buttons on the camera.

The digital camera has both a wireless transceiver port (for example, FIR IRDA or BlueTooth or UWB) as well as a port for accommodating a cable or docking station (for example, USB 2.0). These ports are usable to download images and/or audio for including into the slide show. The images and/or audio can be downloaded from any suitable repository of image and audio information (for example, a personal computer, an MP3 player, another digital camera, a cell phone, or a personal digital assistant). The information can also be ported to the digital camera using a removable storage media (for example, a removable flash card, a memory stick, a removable hard disc drive, or an optical disc).

Using the display and push buttons on the camera, the user selects one of a plurality of "scenarios" for the slide show. The particular scenario selected determines how the selected digital images and the selected audio will be presented in the slide show. A scenario may involve multiple "sequence sets," where a sequence set is a predefined specification of how images will be manipulated in an artistic VJ-like fashion (manipulations include blending, panning, tilting, zooming, rotating). A sequence set can also control aspects of the audio such as fade in, fade out, volume, and changing the audio file being decoded and output. In one novel business method aspect, an experienced visual jockey is consulted to develop elements, sequence sets and scenarios that have high artistic quality. These elements, sequence sets and scenarios are then provided in a production version of the digital camera for use by ordinary consumers.

A powerful hardware zoom engine that performs sub-pixel zooming and that is in used in the digital camera to capture digital images is also used during the generation of the slide show to perform operations such as zooming, panning, and tilting operations. The digital camera electronics including the powerful hardware zoom engine performs these operations in real time as the slide show progresses. Unlike a situation where an IPOD PHOTO is used to generate a slide show, the powerful hardware is provided in the camera for image capturing purposes and providing a sophisticate zoom engine does not entail added cost for the consumer.

In one embodiment, the user can stop and start the slide show using a button on the digital camera. The user can also use buttons on the digital camera to cause a pointer to appear on the television screen and to move the pointer around the television screen.

In some embodiments, the user can customize a scenario in certain ways. Once customized, the customized scenario is used in a subsequent slide show. Automatic face detection within the camera is employed to make the slide show more interesting and VJ-like. The location of a face can, for example, be used to control which parts of an image are emphasized. Face detection can also be used to determine which one of a plurality of images will be emphasized over the others. The detection of a face is provided as an input to the slide show generating software.

In some embodiments, the beat of the audio that accompanies the sequence of images in the slide show is detected. The beat is provided as an input to the slide show generating software. The beat is used to synchronize and time the sequencing of digital images to the accompanying audio to make the slide show more interesting and VJ-like.

In another novel aspect, a single container file contains content files as well as textual information on how to render content in the content files so as to render a slide show in accordance with a scenario. The textual information may, for example, be present in the form of a text file that is contained in the container file. The content files may, for example, include JPEG image files and MP3 audio files. In addition, the single container file may include a textual playlist file that identifies file names of content files that are to be rendered during the slide show. The container file adheres to format requirements for a new standard type of file. This type of file may be called an EVJ file. EVJ stands for electronic visual jockey. EVJ files names may end with .EVJ to denote that they are EVJ files.

A rendering device that includes an EVJ rendering/authoring functionality and that comports with the EVJ standard can be used to read the EVJ file, to parse the text information, and to render content in the content files so as to regenerate the slide show in accordance with the originally specified scenario. The regenerated slide show appears substantially the same as the slide show was originally authored by the slide show creator using another rendering device. A rendering device may, for example, be a digital camera, a desktop personal computer, a laptop personal computer, a television, a combination of a cable set-top box and a display device, a combination of satellite set-top box and a display device, a combination of a digital video disc (DVD) player and a display device, a hand-held slide-show viewing device, a combination of a hand-held slide-show viewing device and a display device, a cellular telephone, an MP3 player, a personal digital assistant (PDA), a combination of a home entertainment center control unit and a television.

A user can use a digital camera having an EVJ rendering/authoring functionality to select a plurality of content files and a scenario for a slide show. The rendering device then generates an EVJ file in the proper EVJ format. To view the slide show on a rendering device, the EVJ rendering/authoring functionality accesses the EVJ file, and parses the text in the EVJ file, and from the text generates a sequence of content manipulation instructions. The content manipulation instructions are carried out by the rendering device such that the content is rendered so as to play the slide show again. Such an EVJ file can be communicated or transferred (for example, emailed or transferred by flash memory card) from the creator of the EVJ file to a second person. The second person can then use a second rendering device that has an EVJ rendering/authoring functionality to render the slide show on the second rendering device in the same way that the EVJ file was rendered by the creator on the first rendering device. Functionality in the rendering device allows an EVJ file to be edited so that when the modified EVJ file is rendered, the slide show is seen in its altered form. Examples of editing that can be performed include adding images, deleting images, changing the order that images are rendered, adding text that will be displayed during the slide show, adding audio snippets, deleting audio snippets, changing the music that accompanies the imagery of the slide show, and editing the definition of the scenario in the EVJ file.

Other embodiments and advantages are described in the detailed description below. This summary does not purport to define the invention. The invention is defined by the claims.

A container file stored on a computer-readable medium, the container file being readable by a rendering device, the rendering device having an ability to translate a code into a corresponding sequence of image manipulation instructions, wherein an image manipulation instruction is an instruction understood by the rendering device on how the rendering device shall render image information, the file comprising: a first image file that contains the image information; and a text file containing the code, wherein the text file does not contain any image manipulation instruction of the sequence of image manipulation instructions. A file stored on a computer-readable medium of a rendering device, the file being readable by the rendering device, the file comprising: a plurality of image files, each image file containing image information; an audio file; and text instructions understandable by the rendering device, the text instructions indicating how the image information in the image files is to be rendered.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
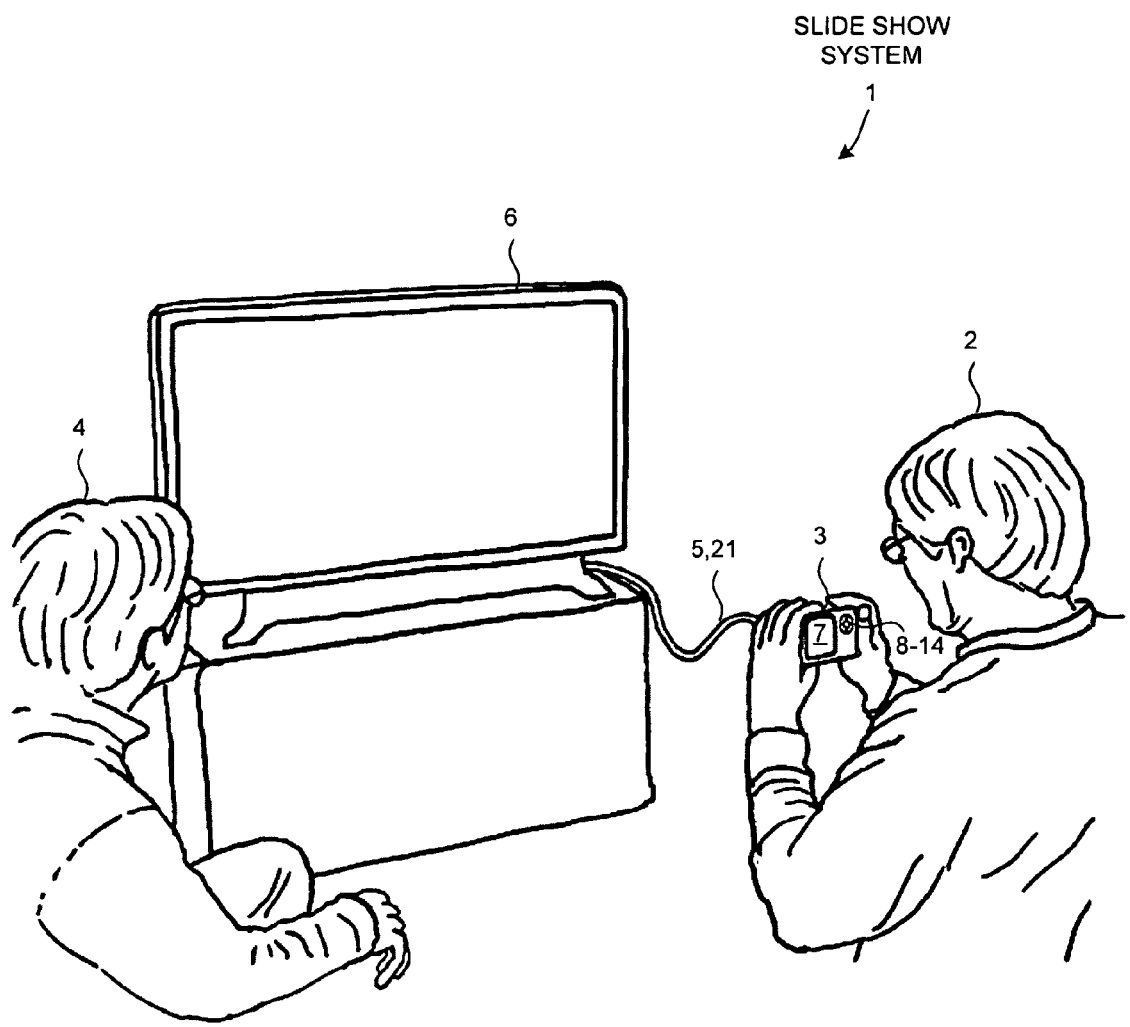
FIG. 1 is a perspective view of a slide show system in accordance with one embodiment.

FIG. 1 is a perspective view of a slide show system 1 in accordance with one embodiment. In an initial step (not shown), a user 2 uses a digital still camera 3 to capture digital still images and to store the digital still images in the form of files (for example, JPEG files) on digital camera 3. Digital image files can also be loaded onto digital camera 3 from another repository of digital image files (for example, a personal computer, a PDA, a cell phone, another digital camera, a portable micro hard disc drive, a portable memory, optical disc). Digital camera 3 includes a microphone that is capable of capturing snippets of audio information (for example, audio present at the time a digital still image is captured by the digital camera). These snippets of audio information are also stored as discrete files on digital camera 3. Music in digital form (for example, MP3, WAV, MP4, AAC, Apple Lossless format files) can also be loaded onto the digital camera from a repository of digital information (for example, a personal computer, a CD player, a DVD player, an MP3 player, a PDA, a cell phone, portable micro hard disc drive, portable memory, optical disc).

Once the digital still images and the audio information is present on digital camera 3, user 2 uses digital camera 3 to display the digital still images and audio information to another individual 4 in an interesting, VJ-like slide show. The showing of the VJ-like slide show is illustrated in FIG. 1. To present the slide show, digital camera 3 is coupled by cables 5 and 21 directly to an HDTV (high definition television, 1280×720) television 6. Cable 5 is a YCRCB component video cable used to communicate video to television 6. Cable 21 is an AV composite cable 21, the audio part of which is used to communicate audio to television 6. Digital camera 3 outputs the digital still images in a sequence in the form of a stream of video information across cable 5 to HDTV television 6 such that the slide show is seen on the television screen. Digital camera 3 outputs the accompanying audio (for example, music and/or audio snippets) across cable 21 to television and the audio is heard on the speakers of the television 6 or other sound system used with the television. User 2 controls the slide show using a display 7 of the digital camera and using buttons 8-14 on the digital camera.

Most if not all of the hardware necessary to provide digital camera 3 the ability to output the video stream and audio stream is already present in conventional digital cameras (for example, digital still cameras employing image processing integrated circuits manufactured by NuCORE Technology Inc. of Sunnyvale CA). In the near future, many consumers will have in their homes both digital cameras of this type as well as HDTV televisions. Consequently, the principal added hardware cost associated with providing user 2 the added capability of being able to show individual 4 the VJ-like slide show is cables 5 and 21. Where digital camera 3 is of a type that includes a large amount of storage space (for example, due to the camera including a micro hard disc drive), a tremendous number of high resolution digital still images can be stored on the digital camera, thereby obviating a need on the part of a consumer to purchase an additional expensive device such as an IPOD PHOTO just to store and to display digital still photographs. There is no need to capture digital still images with a first device (a camera) and then load the captured digital still images onto a second device (an IPOD PHOTO) that has adequate storage to store all the consumer's digital pictures. Digital camera 3 performs both the image capturing function of a camera as well as the digital image storing and displaying functions of an IPOD PHOTO.

Figure 2:
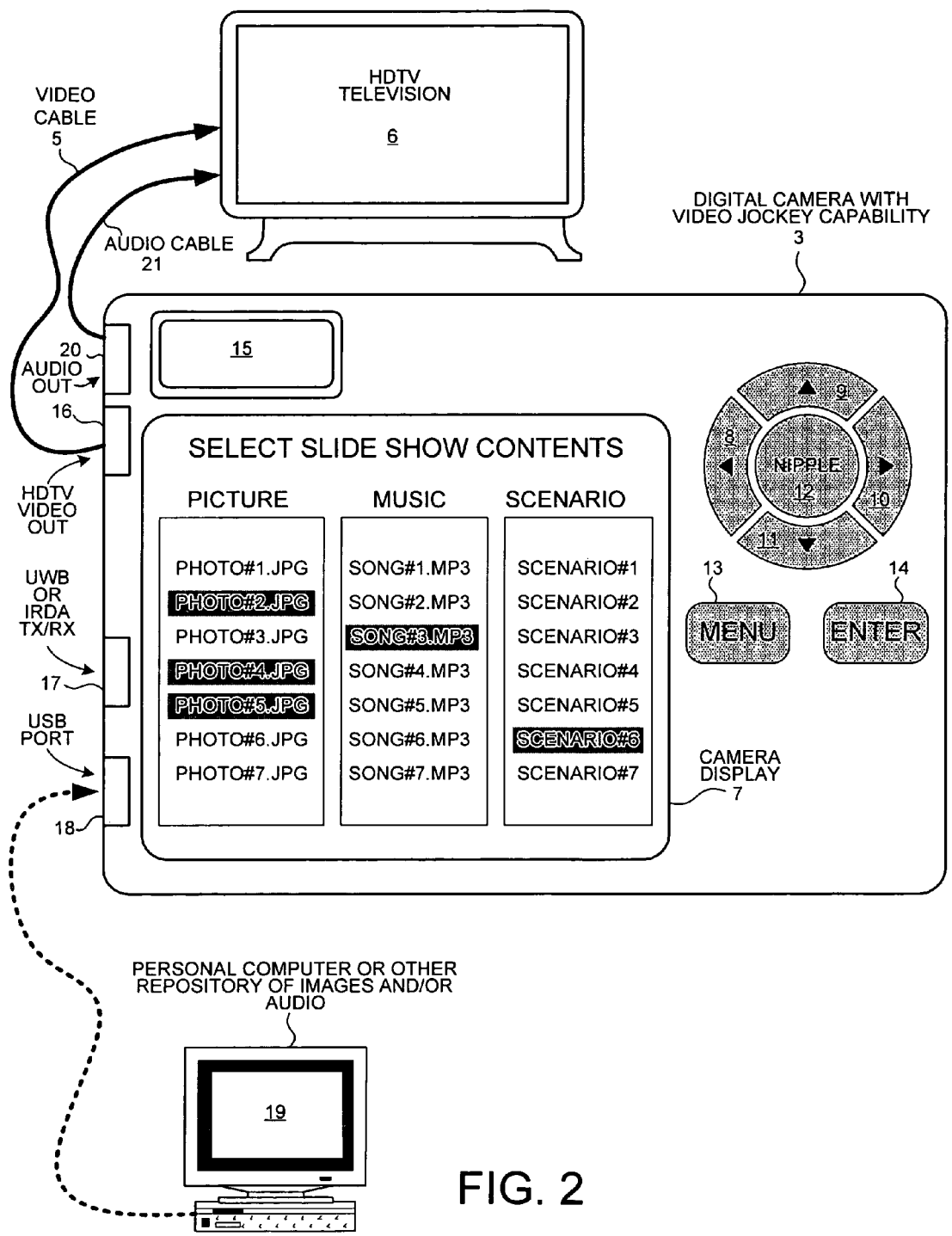
FIG. 2 is a more detailed view of the back side of the digital camera of the slide show system of FIG. 1.

FIG. 2 is a more detailed view of the back side of digital camera 3. The back side includes display 7 (for example, an LCD display), four directional buttons 8-11, a pointer navigating nipple 12, a MENU push button 13, an ENTER push button 14, and a view finder 15. Digital camera 3 also includes a video output port 16. Video output port 16 is shown directly coupled to HDTV television 6 via a video cable 5. Digital camera 3 also includes an audio output port 20. Audio output port 20 is shown directly coupled to HDTV television 6 via an audio cable 21. Digital camera 3 also includes a wireless transceiver port 17 (for example, including an ultra wide band (UWB) transceiver, an FIR IRDA (infrared data association) transceiver, or a Bluetooth transceiver). Wireless transceiver port 17 is usable, for example, to receive digital still images from another wireless device, or to receive digital audio information from another wireless device so that the received images and/or audio information can be incorporated into a VJ-like slide show. Digital camera 3 also includes a port 18 that accommodates a physical connector (for example, a USB 2.0 port). Port 18 is shown coupled to a personal computer 19 via a USB cable. Digital camera 3 can receive digital still images and/or digital audio information from personal computer 19 so that these images and/or audio information can be incorporated into a VJ-like slide show.

FIG. 2 also shows what is displayed on display 7 when user 2 uses digital camera 3 to set up the VJ-like slide show. A plurality of digital image file indicators, a plurality of digital audio file indicators, and a plurality of slide show scenario indicators are displayed. In the example of FIG. 2, the digital image file indicators are file names (for example, PHOTO#1.JPG) shown in a column. In the example of FIG. 2, the digital audio file indicators are file names (for example, SONG#1.MP3) shown in a column. In the example of FIG. 2, the slide show scenario indicators are text names (for example, SCENARIO#1) shown in a column. Each digital image file indicator represents an image file stored on digital camera 3 and each digital audio file indicator represents an audio file stored on digital camera 3.

User 2 uses the four directional buttons 8-11 to identify one of the indicators. A currently identified indicator appears highlighted. The four directional buttons 8-11 are usable to move the highlighting from one indicator to the next, up and down a list of indicators, and left and right across the columns of indicators. When user 2 has highlighted a desired indicator, user 2 presses ENTER button 14 to select the indicator. Once selected, the indicator remains highlighted even if the directional buttons 8-11 are used to move the identified indicator away to another indicator. In this way, user 2 selects a plurality of indicators for digital still images stored on digital camera 3. In the illustration, three digital still image indicators are selected, PHOTO#2.JPG, PHOTO#4.JPG and PHOTO#5.JPG. The list of digital still image indicators can scroll so that a larger number of indicators than seven is available for selection even though only seven can be displayed at a time.

In the same way that user 2 selects a plurality of digital still image indicators, the user 2 uses directional buttons 8-11 and ENTER button 14 to select one of more digital audio indicators (in the present case, the audio information selected is a song SONG#3 stored in MP3 format on the digital camera).

User 2 also selects one of the listed slide show scenario indicators. One scenario may be suited for use with easy listening contemporary music such as smooth jazz. Another scenario may be more suited for use with classic symphonic music. Another scenario may be more suited for use with dance and club music with a rapid beat. Another scenario may be more suited for use with high-energy rock music.

In the present example, SCENARIO#6 is selected. During this selection process, the information displayed on display 7 may also be displayed on the screen of HDTV television 6. Digital camera 2 includes on-screen display circuitry and an image-blending capability usable for the purpose of displaying whatever is shown on display 7 on the screen of HDTV television 7.

Figure 3:
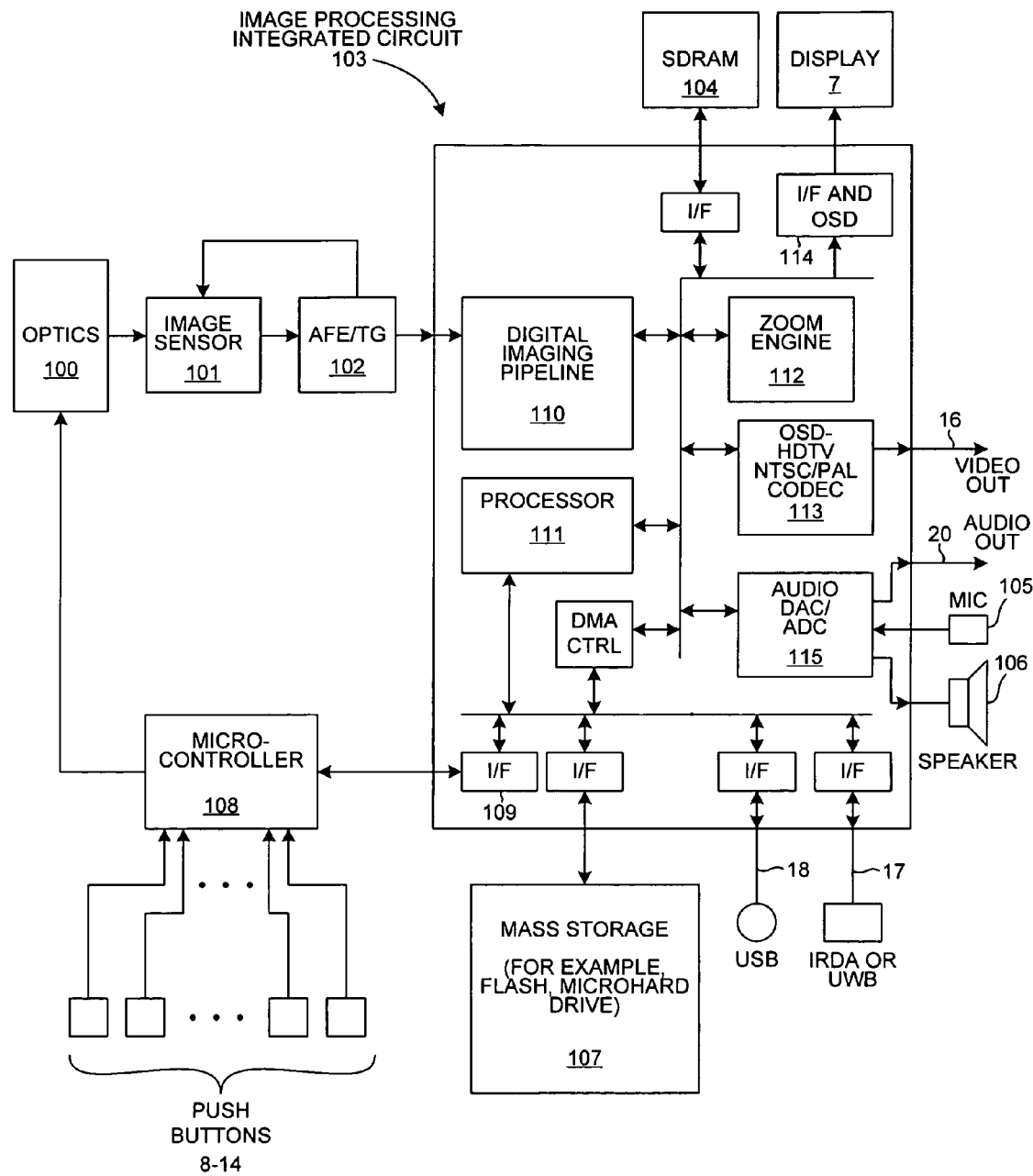
FIG. 3 is a simplified diagram of the electronic circuitry of the digital camera of FIG. 1. An imamge processing integrated circuit 100 as illustrated can be realized as part number SiP-1280 Digital Processor available from NuCORE Technology, Inc. of 1380 Bordeaux Drive, Sunnyvale, Calif.

FIG. 3 is a simplified diagram of the electronic circuitry of digital camera 3. Digital camera 3 includes optics 100, an image sensor 101, an analog front end and timing generator integrated circuit 102, an image processing integrated circuit 103, an amount of SDRAM 104 for the buffering of image information, display 7, a microphone 105, a speaker 106, video output port 16, audio output port 20, wireless transceiver port 17, USB bus port 18, an amount of mass storage (for example, removable flash memory and/or a micro hard disc drive) 107, push buttons including buttons 8-14, and a microcontroller 108. Microcontroller 108 performs, among other functions, key-scanning (button-scanning) functions to detect the pressing of a button. Microcontroller 108 communicates with image processing integrated circuit 103 across a serial bus and employs serial interface circuitry 109. Image processing integrated circuit 103 includes, among other parts, a digital imaging pipeline 110, a processor 111, a zoom engine 112, an HDTV NTSC/PAL codec 113, and an audio DAC/ADC (an digital-to-analog converter and an analog-to-digital converter) 115. On screen display (OSD) circuitry is provided in the interface circuitry 114 for the display so that text and icons can be displayed over a background image.

Figure 4:
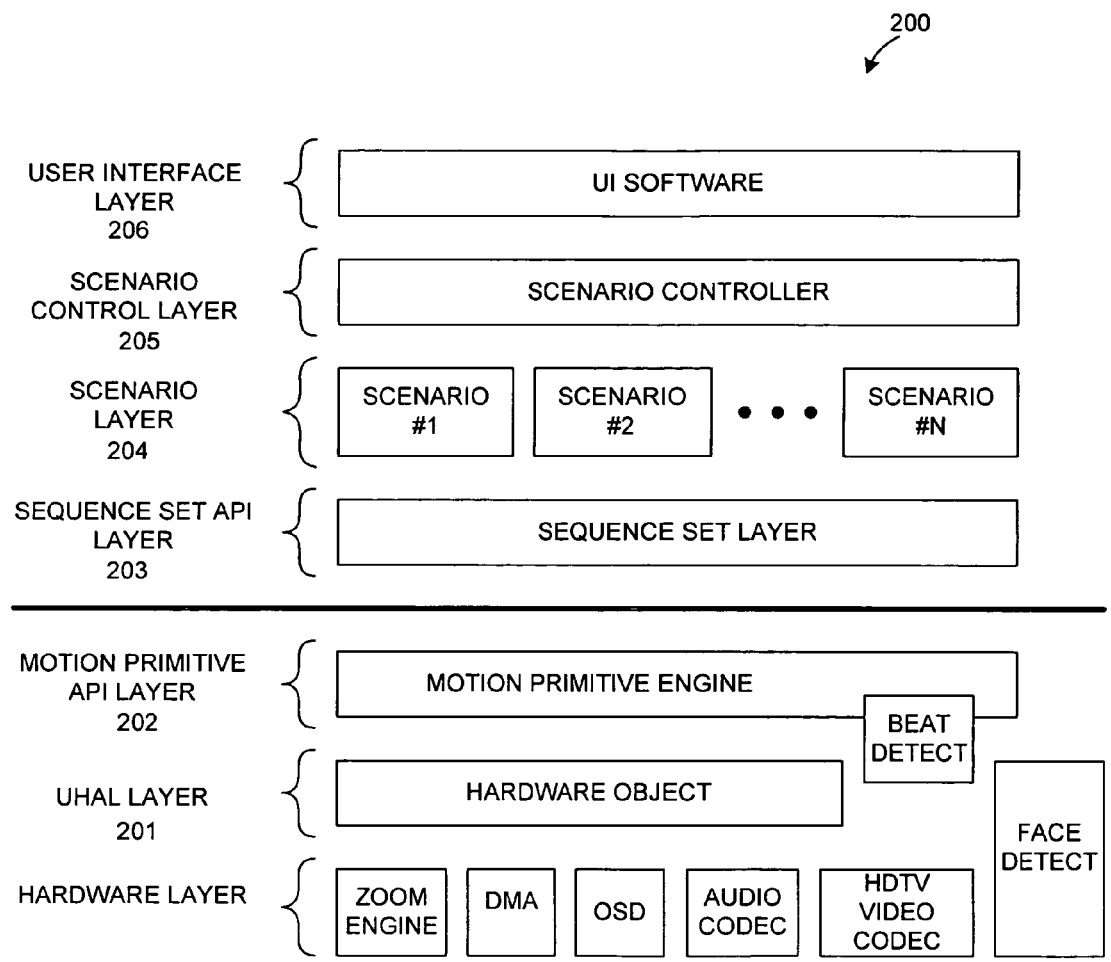
FIG. 4 illustrates the hierarchical structure of slide show generating software that executes on the processor within the image processing integrated circuit of the digital camera of FIG. 1. The processor is the same processor that controls the camera during the capturing of digital images.

FIG. 4 illustrates the structure of slide show generating software 200 that executes on processor 111 within image processing integrated circuit 103. The bottom row of blocks in the diagram represents discrete blocks of hardware circuitry. Each block of hardware circuitry is controlled by software using the hardware object (hardware driver) layer 201. The layer 202 entitled "motion primitive engine" presents a plurality of motion primitive APIs (application programming interfaces) that are made available to higher level software. An example of a motion primitive API is an API call to zoom into a particular location within a particular JPEG image. Such a motion primitive API may be used multiple times to successively zoom into a particular location within a desired digital still image.

Another example of a motion primitive API is an API call to zoom up the size (increase the size as displayed) of a digital image. Another example of a motion primitive API is an API call to zoom down the size (decrease the size as displayed) of a digital image.

Another example of a motion primitive API is an API call to move a particular image to the left with respect to a background image. This operation is called "panning." The panning API may be called multiple times in succession to move a particular image to the left across a background image. There is another similar API for panning to the right with respect to a background image. The background image can be another captured image, or alternatively can be a solid white frame or a solid black frame.

Another example of a motion primitive API is an API call to move a particular image upward with respect to a background image. This operation is called "tilting." Such a tilting motion primitive API may be used multiple times to successively move a particular image upward across a background image. There is another similar API for tilting downward with respect to a background image. The background image can be another captured image, or alternatively can be a solid white frame or a solid black frame.

Another example of a motion primitive API is an API call to perform what is called "filtering" on a particular image. In this sense, filtering involves blending with a blurring effect.

Although the layer of software is called the motion primitive API layer, there are APIs presented by this layer that are not for motion primitives. There are, for example, APIs for controlling the audio DAC/ADC and the HDTV video codec. For example, one API can be called to start the decoding of audio information of a particular file. Codec software executing on processor 111 performs the decoding function and outputs the result to the audio DAC which in turn outputs analog audio onto audio out port 20. Another API can be called to cause digital still image information from a particular file to be supplied to the HDTV video codec such that the codec outputs that information in the form of a video stream onto video out port 16.

There is an API for blending a first image with a second image. A variable field in the API call indicates the proportion (in a percentage number) of the resulting image that is to be of the first image. If for example the proportion is set at thirty percent, then each pixel value of the first image will be multiplied by thirty percent and each corresponding pixel value of the second image will be multiplied by seventy percent, and the two products will be summed to arrive at the pixel value for the resulting image. In the present embodiment, this blending function is performed by processor 111.

Figure 5:
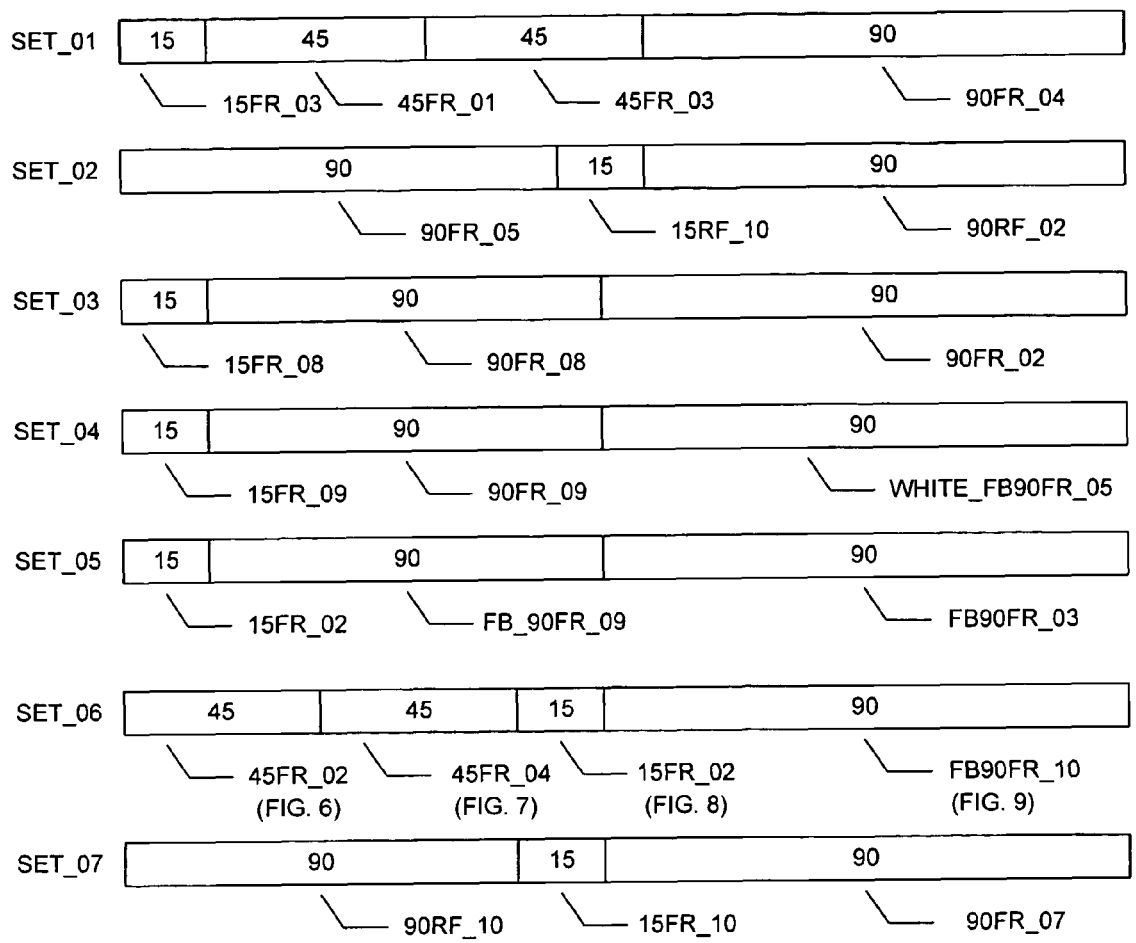
FIG. 5 is a simplified diagram that illustrates seven sequence sets. Each sequence set is made up of multiple elements. The sequence sets and elements may, for example, be developed with the assistance of an artist, film maker, or VJ.

The next layer of software above the motion primitive engine layer 202 is the "sequence set API layer" 203. FIG. 5 is a simplified diagram that illustrates seven sequence sets. Each sequence set is a sequence of elements; Sequence set SET_06, for example, defines the sequence of elements: 45FR_02 (an element 45 frames in duration); 45_FR_04 (an element 45 frames in duration); 15FR_02 (an element 15 frames in duration); and FB90FR_10 (an element 90 frames in duration). Sequence set SET_06 therefore defines a total sequence of 195 frames. Each element defines how an associated set of digital images will be zoomed, panned, tilted, rotated, and blended. A sequence set and what it entails in one embodiment is described in further detail below.

The next layer (see FIG. 4) of software above the sequence set layer 203 is the scenario layer 204. In the illustrated example, there are N possible slide show scenarios from which a user can choose one. Each of these scenarios identifies a sequence of particular sequence sets. When one sequence set associated with a scenario is completed, then the next sequence set associated with the scenario is started, and so on. A scenario and what it entails is described in further detail below.

The next layer of software above the scenario layer 204 is the scenario controller layer 205. This layer defines the particular digital images that are to be associated with the selected scenario. The layer also defines the particular audio information that is to be associated with the selected scenario.

The top layer of software above the scenario controller layer 205 is the user interface (UI) software layer 206. UI layer software controls what is displayed on display 7 during the set up of the slide show. UI layer software detects which buttons are pressed and takes appropriate action to change what is displayed on display 7 and to set up the slide show.

Continuing on with the example of user 2 selecting SCENARIO#6 in FIG. 2, the digital camera 3 determines, due to SCENARIO#6 being selected, that sequence sets SET_06, SET_02 and SET_01 are to be rendered and in that order. From the first sequence set SET_06 (see FIG. 5), the first element is element 45FR_02.

Figure 6:
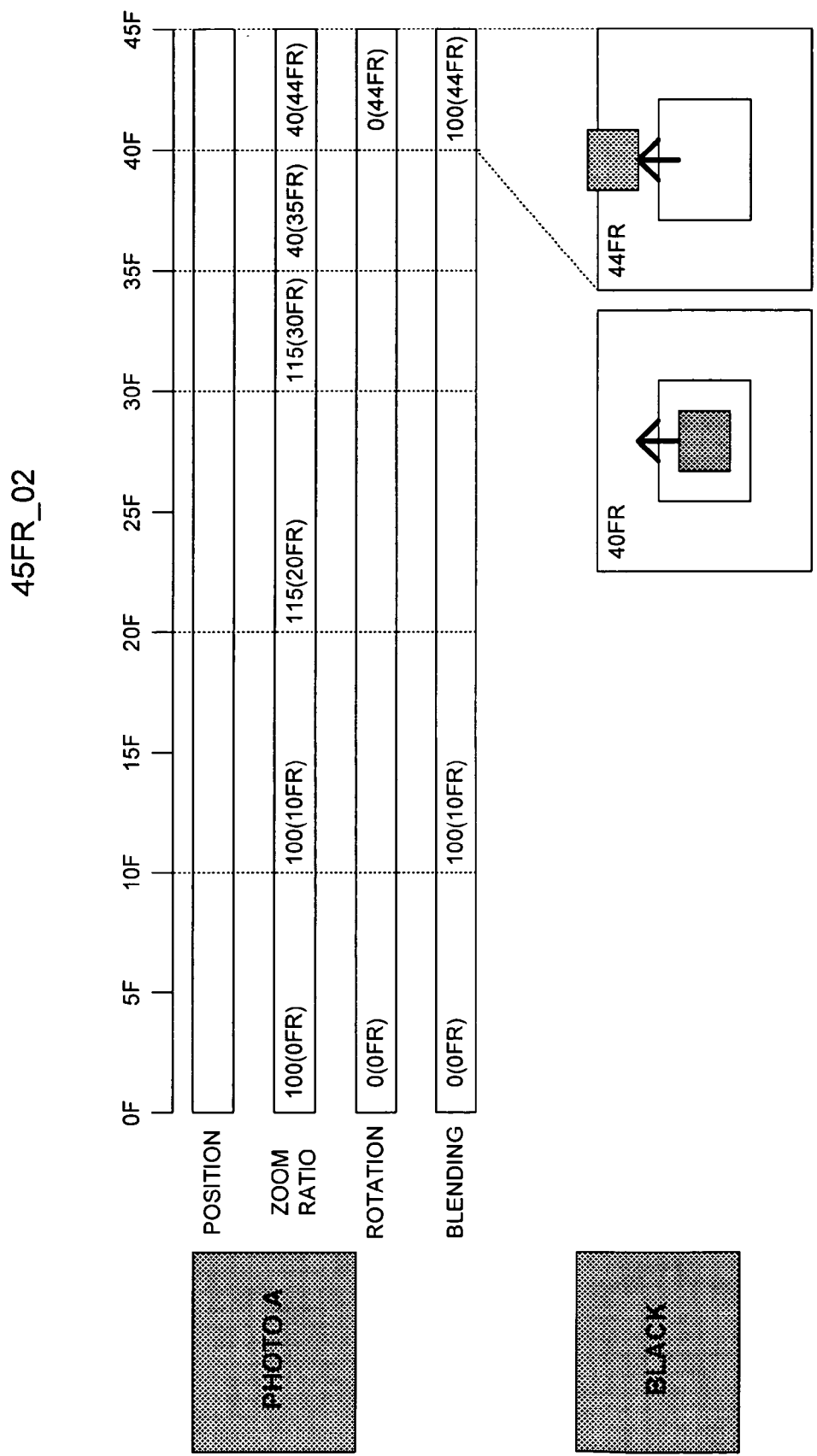
FIG. 6 is a diagram illustrative of the actions to be performed to carry out the element 45FR_02.

FIG. 6 is a diagram illustrative of the actions to be performed to carry out this element 45FR_02. Two digital images are associated with this element: PHOTOA and BLACK. The digital images selected by user 2 are taken in top down order. The uppermost selected digital image PHOTO#2.JPG (from the list as displayed on display 7) is therefore assigned to be PHOTOA. The digital image BLACK is not an actual digital image stored in memory, but rather is a solid field of black pixel information. In FIG. 6, time extends in the direction from left to right. The numbers 0F, 5F, 10F and so forth across the upper part of the diagram represent the number of the frame of video. The "ZOOM RATIO" value 100 (0FR) indicates that PHOTOA is at full size (i.e., zoom=100%) at the time of frame zero. The "ROTATION" value of 0(0FR) indicates that PHOTOA is rotated by zero degrees (i.e., there is no rotation of PHOTOA). The "BLENDING" value 0(0FR) indicates that PHOTOA is at zero percent strength versus the other digital image (the BLACK digital image) at the time of frame zero. Accordingly, the result of the blending is an entirely black digital image.

At time 10F, the zoom ratio and rotation values remain the same, so PHOTOA is not zoomed up or down in size and is not rotated. The blending ratio has, however, gone from a value of zero percent at the time of frame zero to a value of one hundred percent at the time of frame ten. This indicates that at the time of frame ten, PHOTOA is blended with a factor of one hundred percent and the black image is blended with a factor of zero percent. Accordingly, the black image at time zero is gradually blended away with PHOTOA until PHOTOA appears at time 10F unaffected by the black image.

At time 20F, the zoom ratio is 115 (20FR). It is therefore seen that PHOTOA is zoomed up in size so that PHOTOA appears 115 percent of its starting size at time 20F. Note that the same high performance zoom engine is used both to capture images as well as to perform zooming functions during a slide show.

Nothing changes from the time of frame 20F until time of frame 30F. At time 35F, the zoom ratio is 40 (35FR). PHOTOA is therefore zoomed down, starting at time 30F and ending at time 35F, to be forty percent of its starting size.

At time 40F, the tilting of PHOTOA upward is begun as indicated by the left block labeled 40FR that appears underneath the time line. Note the starting position of the forty percent size version of PHOTOA is centered in the screen. The upward pointing arrow indicates the upward tilting of PHOTOA.

At time 44F, the upward tilting of the forty percent size version of PHOTOA has reached the location indicated by the block below the time line labeled 44FR. Note that PHOTOA remains at forty percent of its ordinary size. Element 45FR_02 ends at the time of frame 45.

The zooming, rotation, blending, and tilting indicated by the sequence set of FIG. 6 are motion primitives, each of which is performed by calling a corresponding motion primitive API. Although not shown here, an element can also include API calls to control how the audio is output. An element can cause a certain audio file to start to be decoded and output to the television. An element can cause a volume level to be changed. An element can cause fade in and fade out audio. An element can stop the decoding of a particular audio file.

Figure 7:
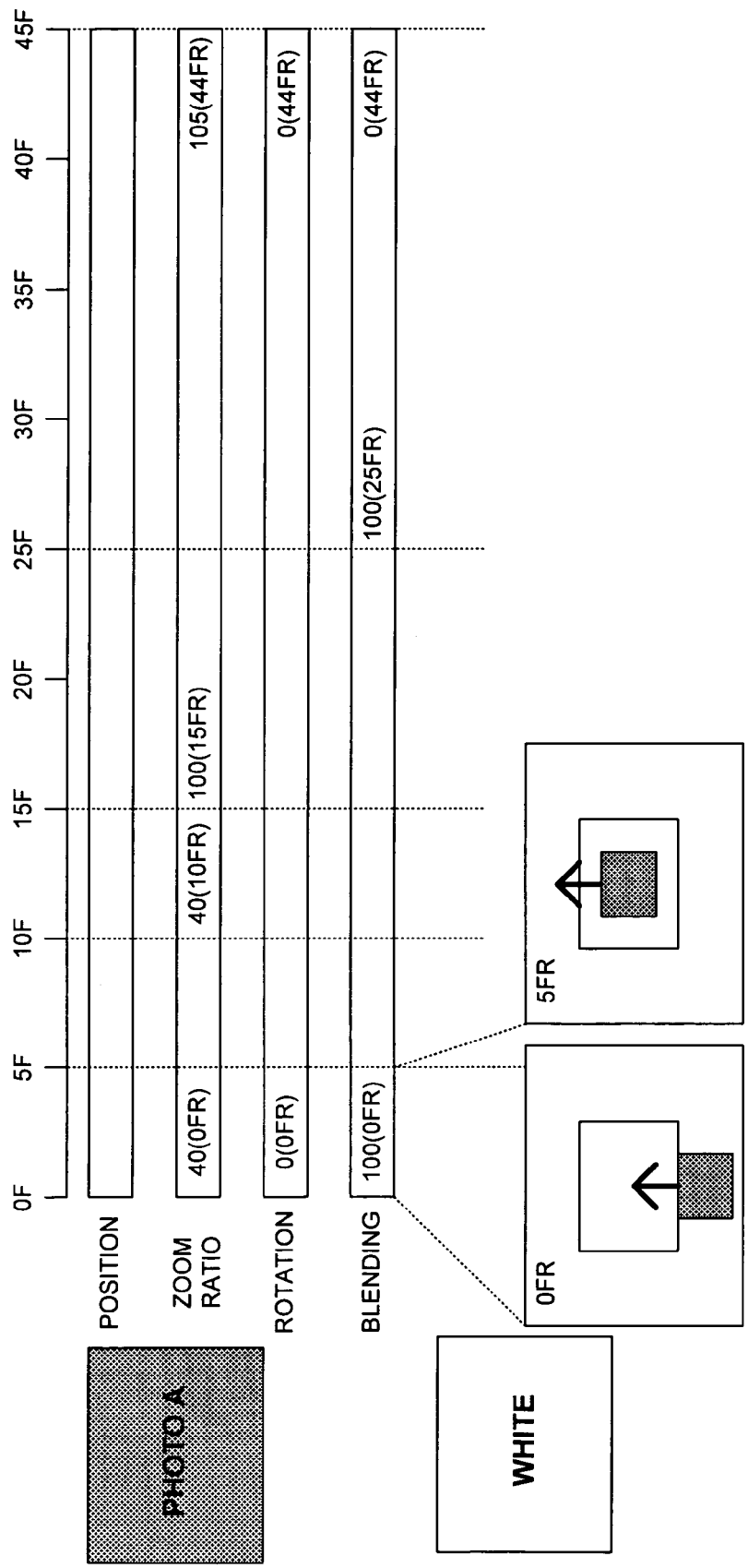
FIG. 7 is a diagram illustrative of the actions to be performed to carry out the element 45FR_04.

FIG. 7 illustrates the next element (element 45FR_04) in sequence set SET_06 of scenario SCENARIO#6. Two digital images are associated with this element: PHOTOA and WHITE. As in the case of the BLACK frame of element 45FR_02, the WHITE frame is not an actual digital image stored in memory, but rather is a solid field of white pixel information.

At the time of frame 0F, the second digital image in the digital still images selected by user 2 (in this example, the digital still image represented by PHOTO#4.JPG) is PHOTOA. As indicated by the 40 (0FR) appearing in the line labeled "ZOOM RATIO," PHOTOA is zoomed to be forty percent of its original size. The starting position of PHOTOA is illustrated in the leftmost block labeled 0FR appearing below the timeline. PHOTOA starts out of the field of view, and tilting starts upward with respect to the background frame.

At the time of frame 5F, the forty percent size version of PHOTOA has reached the center of the field of view as indicated by the rightmost block labeled 5FR appearing below the timeline.

From the time of frame 5F to the time of frame 10F, there is no change. At the time of frame 15F, the zoom ratio is one hundred percent. Accordingly, starting at time 10F, PHOTOA is zoomed up in size so that it is one hundred percent of its original size by time 15F.

From the time of frame 15F to the time of frame 25F, there is no change. Between the times of frames 25F and 45F, the blending percentage changed from one hundred percent at time 25F to zero percent at time 44F. The one hundred percent sized version of PHOTOA is therefore seen to be blended away into a solid white background by time 44F. The element stops at time 45F.

Figure 8:
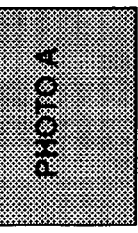
FIG. 8 is a diagram illustrative of the actions to be performed to carry out the element 15FR_02.

FIG. 8 illustrates the next element (element 15FR_02) in sequence set SET_06 of scenario SCENARIO#6. There are three frames involved in this element, a solid white image frame, PHOTOA (which is the next digital still image selected by user 2), and a solid white image frame. PHOTOA in this case is the digital still image represented by PHOTO#5.JPG.

Initially, at the time of frame 0F, the solid white frame is rendered at one hundred percent size but it is blended with a percentage of zero percent. PHOTOA, on the other hand, is blended with the solid black frame with a percentage of zero percent. The overall result is the solid black frame output at the time of frame 0F.

The blending percentage of PHOTOA versus the solid black frame, however, changes from zero percent at time 0F to one hundred percent at time 7F. PHOTOA is therefore seen to emerge from a black screen and appears in undarkened form by time 7F.

The blending percentage for the solid white frame remains at zero percent from the time of frame 0F to the time of frame 8F. From time 8F to time 11F, the blending of the solid white frame changes from zero percent to one hundred percent. PHOTOA at time 0F is at a zoom ratio of zero as indicated by 100 (0FR) and at time 11F is at a zoom ratio of 107 as indicated by 107 (11FR). PHOTOA therefore is at size 107 at the time of frame 11F, but it is blended with a solid white frame at time 11F so the result is a solid white frame.

From time 11F to time 14F, the blending ratio of the solid white frame goes from one hundred percent to zero percent, and the blending of PHOTOA goes from one hundred percent blending with the black frame at time 11F to zero percent at time 14F. The result is a gradual shift from an all white frame at time 11F to an all black frame at time 14F.

Figure 9A:
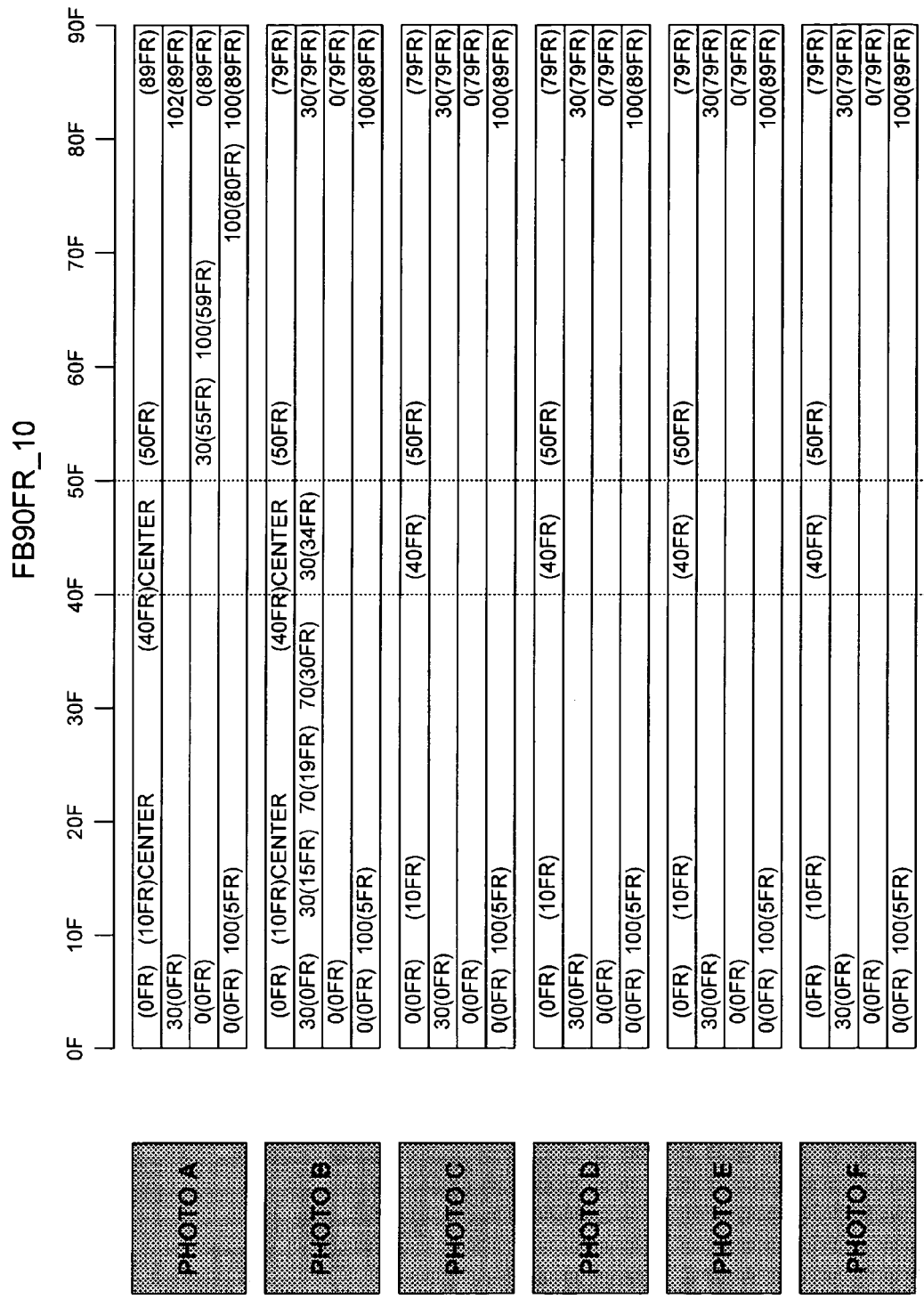
FIG. 9 is a diagram illustrative of the actions to be performed to carry out the element FB90FR_10.
Figure 9B:
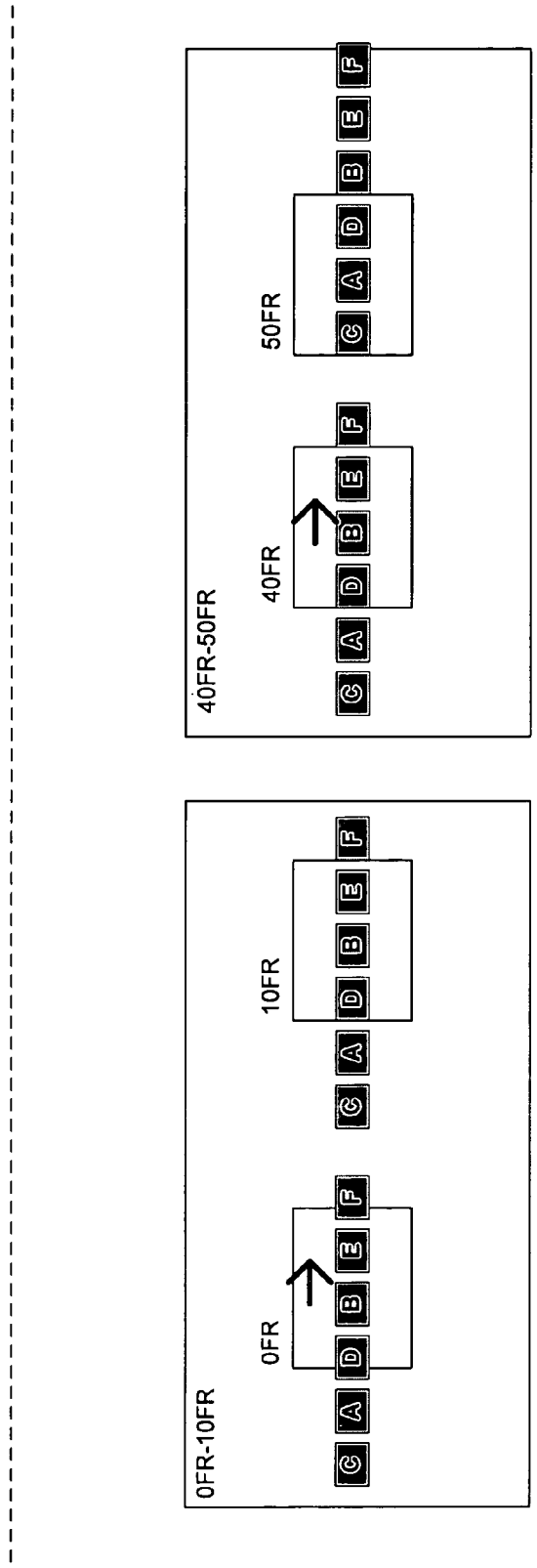
Figure 9B:
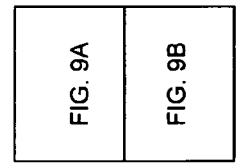

FIG. 9 illustrates the next element (element FB90FR_10) in sequence set SET_06 of scenario SCENARIO#6. There are six frames involved in this element, designated PHOTOA, PHOTOB, PHOTOC, PHOTOD, PHOTOE and PHOTOF in FIG. 9. PHOTOA in this case is a digital still image selected by the user using the user interface seen in FIG. 2 but the selected digital still image file name is not one of the file names highlighted in FIG. 2 but it is rather in the part of the list of image files that is not displayed on the screen.

At the time of frame 0F, the digital still images appear in the positions indicated in the left diagram in the leftmost block below the time line of FIG. 9. The arrow illustrates the direction of panning.

At the time of frame 10F, the digital still images appear in the positions indicated in the right diagram image in the rightmost block below the time line of FIG. 9. The digital still image PHOTOF has moved out of the field of view, and PHOTOD has moved into the field of view. Each of the digital still images PHOTOA-PHOTOF are of at thirty percent size as indicated by the time line. The panning stops at the time of frame 10F. This can be indicated by a stop panning indicator (not shown) in the position rows of the time lines of PHOTOA-PHOTOF.

Starting at the time of frame 15F, only one of the digital still images, PHOTOB, that is in the middle of the field of view, is increased from the thirty percent size to seventy percent size at the time of frame 19F, remains at seventy percent size until the time of frame 30F, and then is decreased in size to thirty percent size at the time of frame 34F. This emphasizes PHOTOB.

This condition remains until the time of frame 40F, when the panning resumes. The resumption of panning can be indicated by a start panning indicator (not shown) in the position rows of the time lines of PHOTOA-PHOTOF. The row of digital still images PHOTOA-PHOTOF is seen to start to pan to the right across the field of view at time 40F. The digital still images PHOTOA-PHOTOF appear in the positions indicated in the left diagram in the rightmost block below the time line of FIG. 9. The arrow illustrates the direction of panning. The panning stops at the time of frame 50FR. At the time of frame 50FR, the digital still images PHOTOA-PHOTOF appear in the positions indicated in the right diagram in the rightmost block below the time line of FIG. 9. From the time of frame 50F to the time of frame 90F, the positions of the images remains fixed.

After sequence set SET_06 has been rendered, the next sequence set of SCENARIO#6, sequence set SET_02 is rendered. Then the last sequence set of the scenario, sequence set SET_01 is rendered. This completes the slide show.

At any time in the slide show, the user can halt the slide show by pressing the ENTER button 14. Pressing the ENTER button 14 again restarts the slide show from the point in the scenario where the slide show was halted. The ENTER button 14 acts as a toggle button for this stop/restart feature.

Digital camera 3 has a pointer overlay that can be superimposed over whatever images are being displayed on television screen 6 during the slide show. The pointer overlay can be made to appear when the slide show is in progress, and can also be made to appear when the slide show is stopped due to use of the ENTER button 14 as set forth above. To cause the pointer overlay to appear, the user manipulates one of the directional buttons 8-11 or manipulates the pointer navigating nipple 12. Microcontroller 108 detects movement of one of these buttons, and informs the image processing integrated circuit 103 via the serial bus and serial interface circuitry 109. The processor 111 within the image processing integrated circuit 103 in conjunction with codec 113 superimposes the pointer on the digital image being displayed on television screen 6 so that the pointer appears as an overlay. Accordingly, pointer information is embedded in the video stream sent to television 6 so that the pointer will appear on the screen of television 6. The user can move the pointer around the television screen of television 6 by manipulating the directional buttons and/or the pointer navigating nipple. The pointer can be made to disappear by having the user take an appropriate action, for example by pressing the ENTER button 14 when the pointer is being displayed. In this case, pressing the ENTER button 14 does not stop or start the slide show, but rather causes the pointer to disappear from the screen of the television.

The slide show as orchestrated by the selected scenario can, in some embodiments, be customized. In one embodiment, user 2 can stop the slide show at a point where customization is to occur by pressing the ENTER button 14. Once the slide show is stopped, user 2 presses the MENU button 13, thereby causing a menu of customization options to appear.

Figure 10:
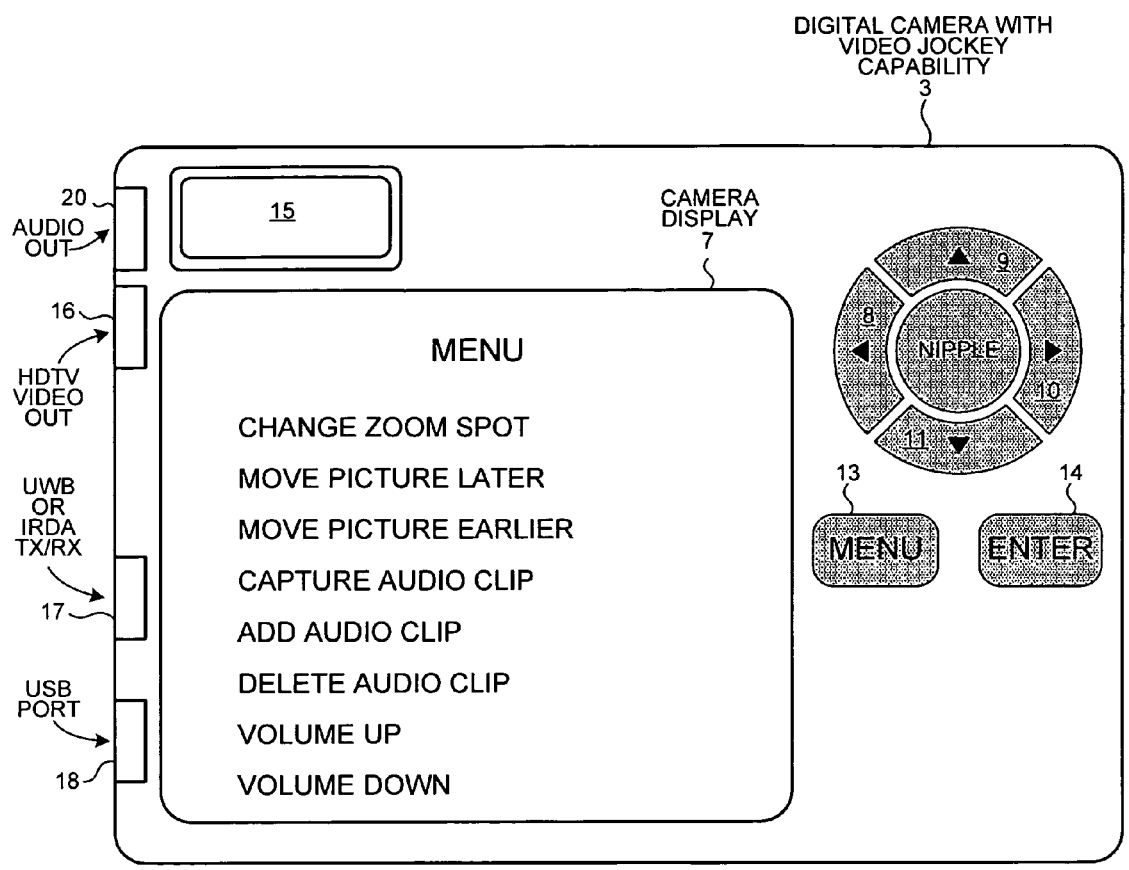
FIG. 10 illustrates a menu of scenario customization options that appear on the display of the camera of FIG. 1.

FIG. 10 illustrates an example of customization options that can be made to appear on display 7. If a location in a digital still image is being zoomed into (is the center of the zoom field) at the time the slide show was halted, the user can change the location. Consider for example a situation in which a scene includes an object of interest and a background. If the scenario is zooming into an uninteresting point in the background, the user can change the point being zoomed into to be a point on the object of interest. Likewise, if the action is a zoom out, and if the point in the digital image being used as the center of the zoom out is not an object of interest but rather is an uninteresting point in the background, then the user can change the point to be a point on the object of interest.

Another option on the menu of FIG. 10 is to move the current digital image one image later in the sequence of images. To do this, the directional buttons are pressed to move the highlighted menu option onto the "MOVE PICTURE LATER" option. Pressing the ENTER button performs the operation.

Another option is to move the current digital image one image earlier in the sequence of images. To do this, the directional buttons are pressed to move the highlighted menu option onto the "MOVE PICTURE EARLIER" option. Pressing the ENTER button performs the operation.

Another option is to capture an audio clip. To do this, the directional buttons are pressed to move the highlighted menu option onto the "CAPTURE AUDIO CLIP" option. Pressing the ENTER button causes the digital camera to start capturing audio from microphone 105. The capturing may, for example, stop after a certain amount of time or when the sound being recorded drops below a certain loudness threshold for a predetermined amount of time. The last captured audio clip can be added into the slide show starting at the time when the slide show was halted by selecting the ADD AUDIO CLIP option and pressing the ENTER button. The added audio clip is output to the television rather than the selected SONG#3.MP3 until the audio clip reaches its end in which case the playing of the SONG#3.MP3 resumes. If an audio clip is being played at the time when the slide show was halted, the audio clip can be deleted from the slide show by selecting the "DELETE AUDIO CLIP" and pressing the ENTER button.

The volume of the accompanying audio can be changed by stopping the slide show, selecting "VOLUME UP" or "VOLUME DOWN" on the menu of FIG. 10, and then pressing the ENTER button.

The customization of the scenario is stored in the digital camera. To replay the slide show with the scenario as modified, the user presses the MENU button 13 which toggles the menu displayed to the menu of FIG. 2. The user then presses the ENTER button without making any PICTURE, MUSIC or SCENARIO changes. This causes the last-selected scenario, SCENARIO#6, to be replayed. When the scenario is replayed, it is replayed as customized by the user. The menu options of FIG. 10 are merely some of the possible ways that a slide show scenario can be changed by a user or customized. The options of FIG. 10 are presented as examples. Other ways of customizing a slide show can be listed on the menu of FIG. 10.

In one embodiment, the digital camera has the ability to detect a human face in a digital still image, and to use the location of the detected face to control how the digital image is zoomed, panned, tilted or otherwise manipulated in the slide show. The existence of a face in an image can, for example, be detected by processing the image to identify areas of image pixels that are in a skin tone color range. The bottom edges of these areas are then determined. The bottom edges are then compared with an arcuate, U-shaped, template of a human chin to see if one of the bottom edges matches the template. A correlation value between the bottom edge and the template is determined. If the correlation value is over a threshold, then the skin tone region is judged to be a face. For additional details on how face detection can be performed, see: 1) U.S. patent application Ser. No. 10/970,804, entitled "Template Matching Method And Target Image Area Extraction Apparatus", filed Oct. 21, 2004 (the content of which is incorporated herein by reference), 2) the article entitled "A Real-Time Multi Face Detection Technique Using Positive-Negative Lines-of-Face Template", by Yuichi Hori et al., Proceedings of the International Conference of Pattern Recognition (ICPR '04), vol. 1, no. 1, pages 765-768 (2004), (the content of which is found in provisional patent application 60/654,709 that is incorporated herein by reference), and 3) the slides entitled "Using Genetic Algorithm As An Application of Wireless Interconnect Technologies for LSI Chip," by Yuichi Hori, (the content of which is found in provisional patent application 60/654,709 that is incorporated herein by reference).

If, for example, the scenario of the slide show defines a zooming into a particular location of an image, and if the image is determined to include a human face as described above, then the location being zoomed into is automatically set to be the location of the detected face. Similarly, if the scenario of the slide show defines a zooming out from a particular location of an image, and if the image is determined to include a human face as described above, then the location from which the zooming out occurs is automatically set to be the location of the detected face. If another motion primitive is to be performed and that motion primitive can be adjusted to emphasize one part of an image over another, then the location where the face was detected can be used to emphasize the part of the image containing the human face.

In one embodiment, the audio information selected in FIG. 2 for accompanying of the slide show is preprocessed to detect a tempo of the audio information. The envelope of the audio loudness can, for example, be analyzed in the frequency domain so that a dominant frequency such as, for example, a drum beat is detected. The timing of this beat of the audio is stored with the audio information. When the scenario is selected and the slide show is started, the result of the previous audio analysis is used to control the rate of change of the images in the slide show. In one example, the appearance and changing of digital images is timed to coincide with the detected audio beat.

The features described above combine to make the slide show generated by digital camera 3 of FIG. 1 more "VJ-like," less repetitive, and less boring than a conventional slide show as generated by an IPOD PHOTO. By providing the slide show generating capability in the digital camera used to capture the images, a consumer need not purchase an additional costly device such as an IPOD PHOTO just to be able to generate a slide show that is viewable on the television. Where digital camera 3 has a large storage capacity, the often onerous task of having to transfer captured digital images from a camera or personal computer to another device (such as an IPOD PHOTO) that has more storage capacity is reduced or eliminated. Digital camera 3 can both store a large collection of digital images as well as generate interesting VJ-like slide shows that can be viewed on a television without involving additional electronic devices.

In one alternative embodiment, the structure of FIG. 4 is modified to include a motion primitive script layer. The motion primitive script layer appears above the dark solid horizontal line in FIG. 4 and below the sequence set layer 203. Motion primitive engine 202 is not provided, but rather box 202 is a motion primitive interpreter. The motion primitive interpreter interprets a motion primitive script and as a result instructs the lower level hardware layer how to carry out appropriate motion primitives specified in the script.

Single File Containing Image Files and Textual Slide Show Definition

Figure 11:
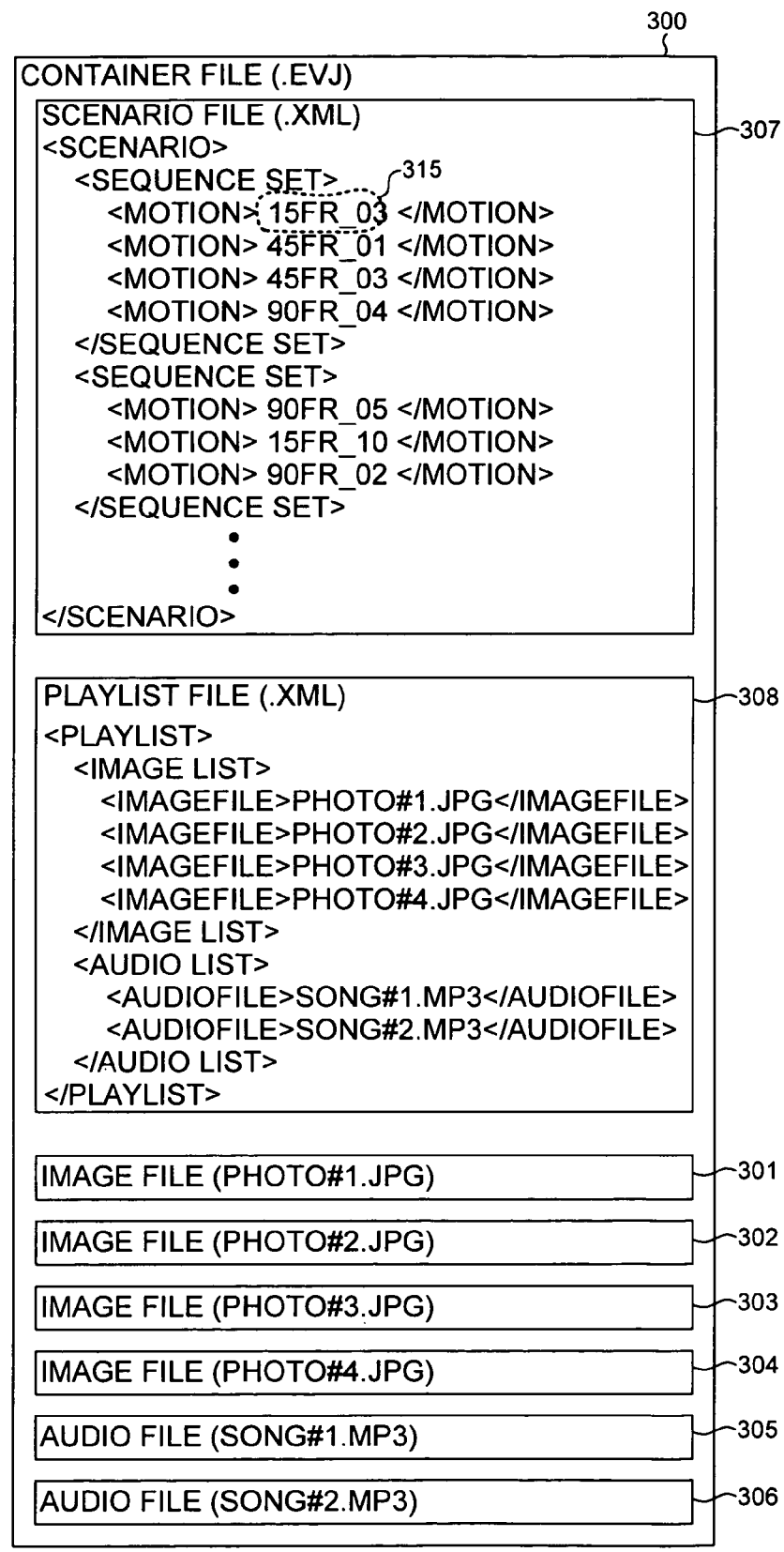
FIG. 11 is a simplified diagram of an EVJ file.

FIG. 11 is a diagram of a single container file 300 that defines a slide show and contains the content to be rendered in the slide show. Container file 300 may, for example, be called an "EVJ file" where "EVJ" stands for electronic visual jockey. Container file 300 may, for example, have a file name that ends in ".EVJ".

Container file 300 contains a plurality of content files, and an amount of text that defines a slide show scenario. In the illustrated example, there are six content files 301-306. Content files 301-304 are JPEG files of still image information. Content files 305 and 306 are .MP3 files containing digital music information. The text that defines the slide show is present in the form of a text file 307. Text file 307 is referred to here as a scenario file. In addition to text file 307 and the content files 301-306, container file 300 may also include another text file 308 called a playlist file. The playlist file 308 contains a list of file names of content files, where the content in the content files will be rendered during the slide show.

Figure 12:
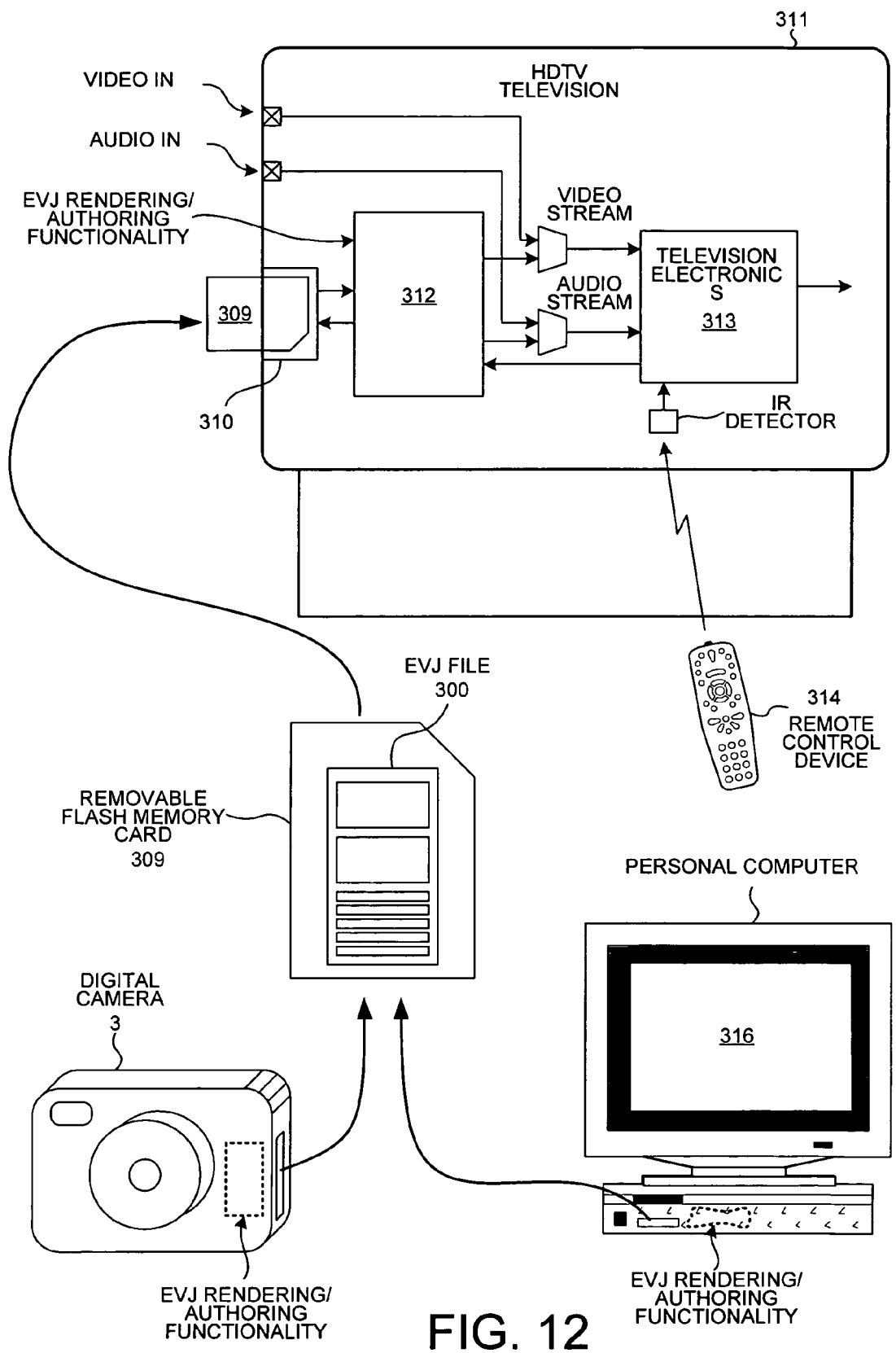
FIG. 12 is an example of an environment in which the EVJ file of FIG. 11 can be used.

FIG. 12 is a diagram of one example of an environment in which EVJ container file 300 may be used. In one example, digital camera 3 is used by a user select a scenario and a plurality of content files. Digital camera 3 then renders a slide show in accordance with the selections and at the same time generates the EVJ container file 300. EVJ container file 300 is stored on a removable flash memory card 309 that is coupled to digital camera 3. The user can then remove flash memory card 309 from digital camera 3 and plug memory card 309 into an accommodating slot 310 in a high definition television (HDTV) 311. HDTV 311 includes an EVJ rendering/authoring functionality 312 as well as standard television electronics 313. A user can control the television using a remote control device 314 in ordinary fashion.

In the present example, after the user plugs memory card 309 into slot 310 in HDTV 311, the user uses remote control device 314 to initiate the EVJ rendering/authoring functionality 312 in accessing and reading the EVJ file 300.

Figure 13:
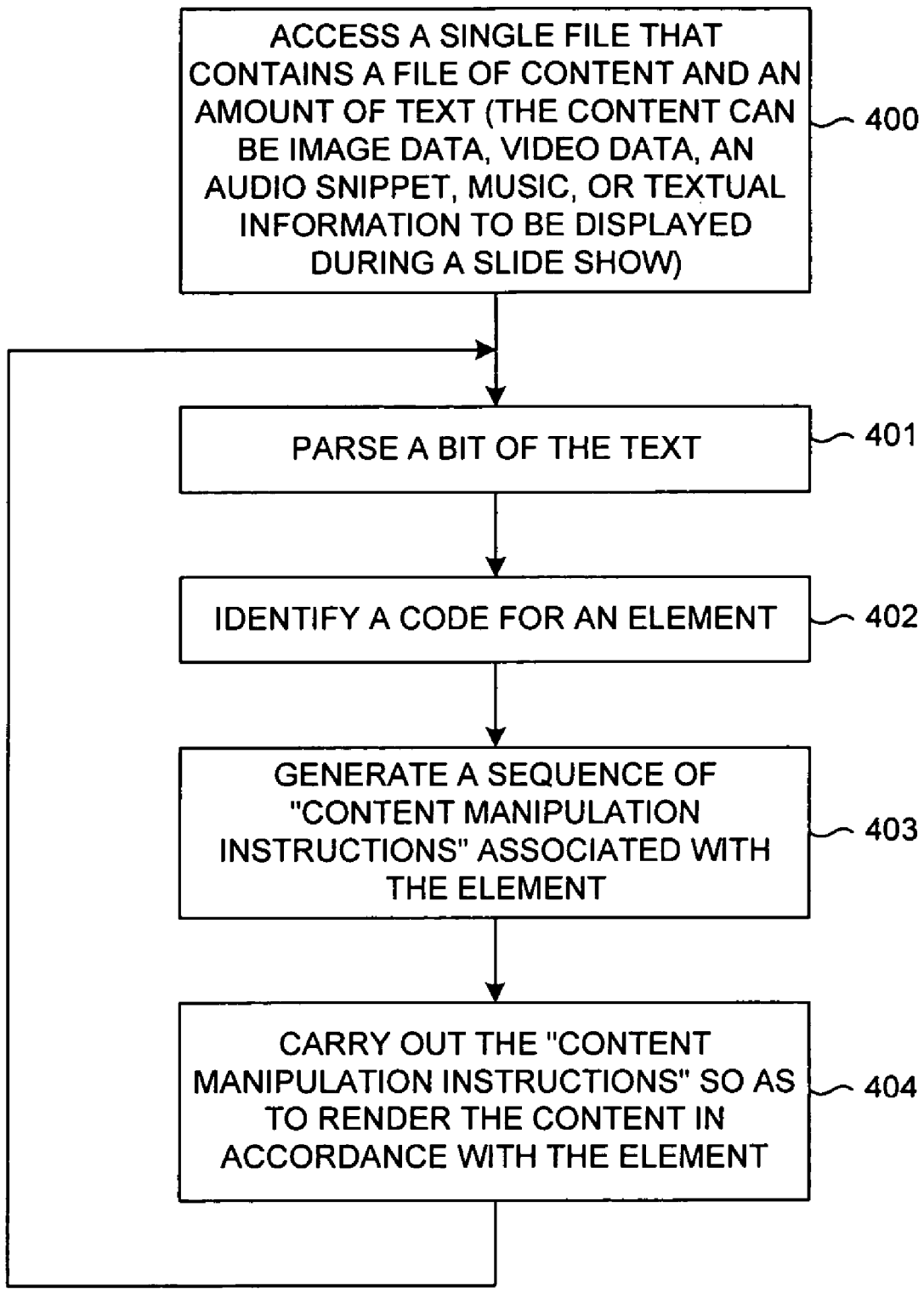
FIG. 13 is a simplified diagram of method involved in the rendering of the EVJ file of FIG. 11.

FIG. 13 is a simplified flow chart of a method of using EVJ file 300 to render a slide show. The step of the EVJ rendering/authoring functionality 312 accessing the EVJ file 300 is step 400 in FIG. 13.

EVJ rendering/authoring functionality 312 in HDTV 311 begins parsing the text in the scenario file 307. In the illustrated example, scenario file 307 defines the scenario that was previously selected by the user of the digital camera 3, where the scenario is a sequence of sequence sets, and where each sequence set is defined as a sequence of elements. EVJ rendering/authoring functionality 312 reads the text of the textual scenario file 307 in order (top-down order in FIG. 11). This parsing of a first bit of the text in the textual scenario file 307 is step 401 in FIG. 13.

A code 315 for an element is found in the text scenario file 307 between a <MOTION> tag and a </MOTION> tag. This code 315 is "15FR_03". EVJ rendering/authoring functionality 312 parses through the text and identifies this code (step 402 in FIG. 13). Code 315 is a code for the first element (element 15FR_03) in the first sequence set (sequence set SET_01) illustrated in FIG. 5.

EVJ rendering/authoring functionality 312 contains information on how to translate each element code that might appear in a scenario file into a corresponding sequence of content manipulation instructions. Content manipulation instructions may include instructions to blend images from image files, zoom an image from an image file, pan an image from an image file, tilt an image from an image file, flip an image from an image file, rotate an image from an image file, start playing audio from an audio file, stop playing audio from an audio file, change the volume of audio being rendered, display text on the screen, blend an audio snippet from an audio file with music from another audio files, and so forth. Content may be still image information, video information, audio snippet information, music, and textual information.

In the illustrated example, EVJ file 300 does not contain a list of content manipulation instructions for rendering the 15FR_03 element. This information is, however, known to the EVJ rendering/authoring functionality 312. EVJ rendering/authoring functionality 312 translates the code 315 into an appropriate sequence of content manipulation instructions (step 403 of FIG. 13). The content manipulation instructions are then carried out by the EVJ rendering/authoring functionality 312 in order and at the appropriate times so as to render the content identified by the playlist file 308 in accordance with the element (step 404 in FIG. 13). The EVJ rendering/authoring functionality 312 repeats this process, parsing through the text of scenario file 307 in order. Where rendering of an element calls for an additional image, the additional image is the image contained in the next image file listed in playlist file 308. The images that appear in the slide show are therefore rendered in the order indicated in playlist file 308. Similarly, when rendering of an element calls for an additional amount of audio to be played, the additional audio is the audio contained in the next audio file listed in playlist file 308.

In one embodiment, scenario file 307 includes a hierarchical definition of a scenario, where one portion of the scenario file points to another portion of the scenario file. A sequence set is defined to be a sequence of elements, where the elements are taken from a group of predetermined elements known to the EVJ rendering/authoring functionalities of rendering devices. Multiple such sequence sets are defined in the scenario file. A scenario is defined to be a sequence of selected ones of the defined sequence sets. Once a sequence set is defined, that definition can be referenced multiple times in the definition of the scenario.

When an EVJ file is read by an EVJ rendering device and is found not to include a scenario file, or where the EVJ rendering device is unable to decipher the scenario file, then the EVJ rendering device uses a default scenario to render the content found in the EVJ file. The EVJ rendering device stores information on the default scenario so that the default scenario need not be included in the EVJ file.

In addition to the tags illustrated in FIG. 11, EVJ container file 300 includes tags that identify a creator name field, a created date field, a modified date field, and a size field. EVJ container file 300 also contains a field that contains a code, where the code indicates baseline hardware capabilities necessary to properly render the file. The code may, for example, indicate that any images contained in the file are of no more than a certain resolution or that the images are in a certain format (for example, 4:2:2).

In one embodiment, EVJ rendering/authoring functionality of a rending device is usable to view a slide show, stop the slide show at a desired point (for example, using remote control device 314), identify a content being rendered at the time in the slide show when the slide show was stopped, select the file name that contains the identified content, and extract the content file. A copy of the content file may, for example, then be stored on the rendering device as a separate file from the EVJ file. Using this mechanism, a person viewing a slide show can extract a file containing a desired still image seen in the slide show. The file, once extracted and copied, can be transferred from device to device as any other file.

In one embodiment, a user can use the rendering device to view the text in the EVJ file, to edit the text, and to store the modified EVJ file. The order of images appearing when the EVJ file is rendered can be changed by viewing the playlist 308, and changing the order of the content file names appearing in the playlist, and then saving the modified version of the EVJ file. Content file names can be removed from a playlist in this fashion, and content file names can be added in this fashion. Where the file name of a content file is added to a playlist, the identified content file can also be added to the EVJ file using the rendering device. All of these editing functions can be controlled using the remote control device 314. Using remote control device 314, an EVJ file can be rendered, altered, rendered again, altered again, and so forth such that the ultimate EVJ file is customized in a manner desired by the user. An ordinary text editor program can be used to edit a text file within an EVJ file. An EVJ file can be copied, stored, and transferred from computer to computer as other types of files are commonly copied, stored and transferred. An EVJ file for a slide show can, for example, be generated by a first person using a first rendering device, the resulting EVJ file can then be emailed from the first person to a second person, and then the second person can use a second rendering device to read the EVJ file and render content contained in the EVJ file so as to replay the slide show.

A personal desktop computer 316 is shown in FIG. 12 to illustrate the point that an ordinary personal computer can be a rendering device. The EVJ rendering/authoring functionality can be a software implementation such that no special hardware other than standard personal computer hardware is required to implement the rendering device. Although the mode of transferring the EVJ file from one rendering device to another rendering device in the example of FIG. 12 is a flash memory card, this mode is presented only as an example. Any mechanism for communicating files from one electronic device to another can be employed.

A rendering device may have a capability of storing the slide show video stream on an optical disc such as a standard DVD optical disc. The slide show can then be viewed by simply playing the DVD (for example, using a DVD player and a television).

The EVJ rendering/authoring functionality 312 in television 311 may be implemented using the very same image processing integrated circuit 103 employed in digital camera 3. By using the same integrated circuit in a television rendering device that is already in use in digital cameras, non-recurring engineering costs associated with building the EVJ functionality into the television are reduced. Where increased volumes of integrated circuit 103 are manufactured due to the use of the same integrated circuit in televisions and cameras, the unit cost of producing integrated circuit 103 can be reduced when compared to the cost of producing integrated circuit 103 just for use in digital cameras.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A container file stored on a computer-readable medium, the container file being readable by a rendering device, the rendering device having an ability to translate a code into a corresponding sequence of image manipulation instructions, wherein an image manipulation instruction is an instruction understood by the rendering device on how the rendering device shall render image information, the file comprising:
a first image file that contains the image information; and
a text file containing the code, wherein the text file defines a scenario, the text file defining the scenario to be a plurality of sequence sets, the text file defining each sequence set of the plurality of sequence sets to be a sequence of elements, wherein each of the elements defines a sequence of image manipulation instructions, wherein the code is an indication of one of the elements, and wherein the text file does not contain any image manipulation instruction of the sequence of image manipulation instructions.

2. The container file of claim 1, wherein the element indicated by the code defines how an associated set of digital images will be zoomed, panned, tilted, rotated, and blended.

3. The container file of claim 1, wherein the container file further includes a second image file containing image information, wherein one of the image manipulation instructions of the sequence is an instruction to blend image information of the first image file with image information of the second image file.

4. The container file of claim 1, wherein one of the image manipulation instructions of the sequence is an instruction to zoom image information of the first image file.

5. The container file of claim 1, wherein one of the image manipulation instructions of the sequence is an instruction to pan image information of the first image file.

6. The container file of claim 1, wherein the rendering device is taken from the group consisting of: a digital camera, a desktop personal computer, a laptop personal computer, a television, a combination of a cable set-top box and a display device, a combination of satellite set-top box and a display device, a combination of a digital video disc (DVD) player and a display device, a hand-held slide-show viewing device, a combination of a hand-held slide-show viewing device and a display device, a cellular telephone, a personal digital assistant (PDA), an MP3 player, a combination of a home entertainment center control unit and a television.

7. The container file of claim 1, wherein the first file is taken from the group consisting of: a JPEG file, a TIFF file.

8. The container file of claim 1, the container file further comprising:
an audio file.

9. The container file of claim 1, wherein the container file includes an indication of an individual who created the container file.

10. The container file of claim 1, wherein the code is an indication of an element, wherein the element defines a sequence of content manipulation instructions, and wherein a content manipulation instruction of the sequence is taken from the group consisting of: blending images from image files, zooming an image from an image file, panning an image from an image file, tilting an image from an image file, flipping an image from an image file, rotating an image from an image file, starting to play audio from an audio file, changing a volume of audio being rendered, displaying text on a screen, and blending an audio snippet from a first audio file with music from a second audio file.

11. A file stored on a computer-readable medium of a rendering device, the file being readable by the rendering device, the file comprising:
a plurality of image files, each image file containing image information;
an audio file; and
text instructions including a code understandable by the rendering device, the text instructions indicating how the image information in the image files is to be rendered, the text instructions defining a scenario, the text instructions defining the scenario to be a plurality of sequence sets, the text instructions defining each sequence set of the plurality of sequence sets to be a sequence of elements, wherein each of the elements defines a sequence of image manipulation instructions, wherein the code is an indication of one of the elements, and wherein the text instructions do not contain any instruction of the sequence of rendering of image information.

12. The file of claim 11, wherein the file includes a text file, and wherein the text instructions are contained in the text file.

13. The file of claim 11, wherein the rendering device can render a slide show involving a display of image information from the plurality of image files by following the text instructions, wherein the rendering device outputs audio from the audio file during the display of image information during the slide show.

14. The file of claim 11, wherein the text instructions are a stream of motion primitive instructions.

15. The file of claim 11, wherein the text instructions are converted by the rendering device into a stream of motion primitive instructions.

16. The file of claim 15, wherein the motion primitive instructions include zoom instructions, pan instructions, tilt instructions, and blend instructions.

17. A method, comprising:
using a first slide show rendering device to select a plurality of image files and a selected one of a plurality of slide show scenarios;
using the first slide show rendering device to generate a single file that contains the plurality of image files and that contains an amount of text containing a code that describes the selected slide show scenario, the amount of text defining the scenario to be a plurality of sequence sets, the amount of text defining each sequence set of the plurality of sequence sets to be a sequence of elements, wherein each of the elements defines a sequence of image manipulation instructions, wherein the code is an indication of one of the elements;
transferring the single file from the first slide show rendering device to a second slide show rendering device; and
using the second slide show rendering device to read the single file and to translate the amount of text into image manipulation instructions, the image manipulation instructions being carried out by the second slide show rendering device such that images associated with the image files are displayed in accordance with the selected slide show scenario.

18. The method of claim 17, wherein the text is viewable on a display of the first slide show rendering device, and wherein the text is viewable on a display of the second slide show rendering device.

19. The method of claim 17, wherein the single file does not contain the image manipulation instructions.

20. The method of claim 17, wherein the transferring involves a communication across a computer network, wherein the computer network communicatively links the first slide show rendering device and the second slide show rendering device.

* * * * *